United States Patent
Rhyu et al.

(10) Patent No.: US 10,158,888 B2
(45) Date of Patent: Dec. 18, 2018

(54) METHOD AND APPARATUS FOR REPRODUCING VIDEO DATA

(71) Applicants: Samsung Electronics Co., Ltd., Suwon-si, Gyeonggi-do (KR); UNIVERSITY-INDUSTRY COOPERATION GROUP OF KYUNG HEE UNIVERSITY, Yongin-si, Gyeonggi-do (KR)

(72) Inventors: Sung-Ryeul Rhyu, Yongin-si (KR); Kyung-Mo Park, Seoul (KR); Yiling Xu, Suwon-si (KR); Gi-Jun Park, Yongin-si (KR); Jang-Won Lee, Suwon-si (KR); Kyu-Heon Kim, Seoul (KR); Gwang-Hoon Park, Seongnam-si (KR); Doug-Young Suh, Seongnam-si (KR)

(73) Assignees: Samsung Electronics Co., Ltd., Suwon-si (KR); University-Industry Cooperation Group of Kyung Hee University, Yongin-si (KR)

(*) Notice: Subject to any disclaimer, the term of this patent is extended or adjusted under 35 U.S.C. 154(b) by 132 days.

(21) Appl. No.: 14/397,358

(22) PCT Filed: Apr. 25, 2013

(86) PCT No.: PCT/KR2013/003569
§ 371 (c)(1),
(2) Date: Oct. 27, 2014

(87) PCT Pub. No.: WO2013/162304
PCT Pub. Date: Oct. 31, 2013

(65) Prior Publication Data
US 2015/0085940 A1    Mar. 26, 2015

(30) Foreign Application Priority Data
Apr. 25, 2012  (KR) .................. 10-2012-0043182

(51) Int. Cl.
*H04N 5/765* (2006.01)
*H04N 19/85* (2014.01)
(Continued)

(52) U.S. Cl.
CPC ............. *H04N 19/85* (2014.11); *H04N 5/765* (2013.01); *H04N 21/234327* (2013.01);
(Continued)

(58) Field of Classification Search
CPC ............... H04N 19/85; H04N 5/765; H04N 21/234327; H04N 21/4325; H04N 21/4621; H04N 21/85406
(Continued)

(56) References Cited

U.S. PATENT DOCUMENTS

2006/0051057 A1* 3/2006 Nakagawa ............ G11B 27/28
                                                                386/248
2007/0110150 A1   5/2007 Wang et al.
(Continued)

FOREIGN PATENT DOCUMENTS

CN      101313578 A     11/2008
JP      2009512307 A     3/2009
(Continued)

OTHER PUBLICATIONS

Amon et al., "File Format for Scalable Video Coding", Sep. 2007, IEE Transactions on Circuits and Systems for Video Technology, vol. 17, No. 9.*
(Continued)

*Primary Examiner* — William C Vaughn, Jr.
*Assistant Examiner* — Joseph Daniel A Towe
(74) *Attorney, Agent, or Firm* — Jefferson IP Law, LLP

(57) ABSTRACT

A method and an apparatus for reproducing video data are provided. The method includes the steps of extracting a coded video data stream and video data attribute information
(Continued)

from the stored video file, extracting samples relevant to an expanded time layer from the extracted video data stream on the basis of the location information of the sample which allows for temporal layer access contailed in the video data attribute information, and restoring and reproducing the extracted samples.

8 Claims, 4 Drawing Sheets

(51) Int. Cl.
*H04N 21/432* (2011.01)
*H04N 21/854* (2011.01)
*H04N 21/2343* (2011.01)
*H04N 21/462* (2011.01)

(52) U.S. Cl.
CPC ..... *H04N 21/4325* (2013.01); *H04N 21/4621* (2013.01); *H04N 21/85406* (2013.01)

(58) Field of Classification Search
USPC .................................................. 375/240.26
See application file for complete search history.

(56) References Cited

U.S. PATENT DOCUMENTS

| 2008/0225116 A1 | 9/2008 | Kang et al. |
| 2009/0003439 A1* | 1/2009 | Wang et al. ........... H04N 19/70 375/240.08 |
| 2009/0148070 A1* | 6/2009 | Hwang .............. H04N 13/0048 382/305 |
| 2010/0153395 A1 | 6/2010 | Hannuksela et al. |
| 2012/0023250 A1* | 1/2012 | Chen ............. H04N 21/234327 709/231 |
| 2012/0082237 A1 | 4/2012 | Jang et al. |
| 2012/0183076 A1* | 7/2012 | Boyce ................. H04N 19/105 375/240.25 |
| 2013/0124749 A1 | 5/2013 | Thang et al. |

FOREIGN PATENT DOCUMENTS

| JP | 2011-528868 A | 11/2011 |
| KR | 10-2010-0030648 A | 3/2010 |
| KR | 10-2012-0033289 A | 4/2012 |
| KR | 10-2012-0038367 A | 4/2012 |

OTHER PUBLICATIONS

Gruneberg et al., "Deliverable D3.2 MVC/SVC storage format", Information and Communication Technologies (ICT) Programme. Jan. 29, 2009.*

Amon et al., "File Format for Scalable Video Coding", Sep. 2007, IEE Transactions on Circuits and Systems for Video Technology, vol. 17, No. 9. (Year: 2007).*

Amon et al., File Format for Scalable Video Coding, IEEE Transactions on Circuits and Systems for Video Technology, Sep. 1, 2007, pp. 1174-1185, vol. 17, No. 9, XP11193013, IEEE, Piscataway NJ, US.

Gruneberg et al., Deliverable D3.2 MVC/SVS Storage Format, Information and Communication Technologies (ICT) Programme, Project No. FP7-ICT-214063, Jan. 29, 2009, pp. 1-34, XP002599508, The SEA Consortium.

* cited by examiner

```
aligned(8) class TemporalLayerAccessSampleBox
extends FullBox('tlas', version = 0, 0) {
    unsigned int(32)  entry_count;
    int i;
    for (i=0; i < entry_count; i++)    {
    unsigned int(32) sample_number;
       }
}
```

METHOD AND APPARATUS FOR REPRODUCING VIDEO DATA

CROSS-REFERENCE TO RELATED APPLICATION(S)

This application is a U.S. National Stage application under 35 U.S.C. § 371 of an International application filed on Apr. 25, 2013 and assigned application number PCT/KR2013/003569, which claimed the benefit of a Korean patent application filed on Apr. 25, 2012 in the Korean Intellectual Property Office and assigned Serial number 10-2012-0043182, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) SAMSUNG ELECTRONICS CO., LTD. and 2) UNIVERSITY-INDUSTRY COOPERATION GROUP OF KYUNG HEE UNIVERSITY.

TECHNICAL FIELD

The present disclosure relates to a method and an apparatus for reproducing video data. More particularly, the present disclosure relates to a method and an apparatus for recording access location information on the extension of a temporal layer of video data and for reproducing the video data by using the location information.

BACKGROUND

Video compression technology has progressed and developed into the current state of high efficiency video compression technology (i.e., high efficiency video coding), and the Moving Picture Experts Group (MPEG), which is an international standard organization, is proceeding with the standardization of high efficiency video compression technology. Accordingly, the MPEG is also proceeding with the standardization of file formats for storing compressed video data.

A typical media file format basically includes a header part and an image data part. The header part describes information of the relevant media, and the image data part stores the compressed media data. For a typical media file format, the MPEG defined an International Organization for Standardization base media File Format (ISOFF) capable of being commonly applied to various applications. The ISOFF was designed to enable data, such as a compressed media stream, configuration information related to the compressed media stream, etc., to be hierarchically stored in multiple container boxes.

The high efficiency video compression technology of the related art defines a picture related to temporal layer access as one of Network Abstraction Layer (NAL) unit types, and includes, in an NAL header, information of the picture related to the temporal layer access. A picture enabling temporal layer access can be recognized by using the relevant information, and a temporal layer can be extended on the basis of the recognized picture.

A video file format according to the high efficiency video compression technology defines, in a sample group description box, a temporal layer identification value (i.e., a temporal layer IDentifier (ID)) indicating layer information on the temporal layer. Layer information on a relevant sample can be expressed by using the temporal layer identification value.

However, only expressing the layer information of the relevant sample by using the temporal layer identification value has difficulty in representing temporal layer access location information of a sample enabling the extension of a temporal layer. This is because NAL header information corresponding to each sample must be analyzed in order to recognize the temporal layer access location information.

Therefore, in order to efficiently extend a temporal layer, temporal layer access location information on a sample enabling temporal layer access must be stored in the high efficiency video compression file format of the related art.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an International Organization for Standardization base media File Format (ISOFF)-based storage file format, in which temporal layer access location information on a sample enabling temporal layer access can be stored in order to efficiently extend a temporal layer.

In accordance with an aspect of the present disclosure, a method for reproducing video data is provided. The method includes extracting a coded video data stream and video data attribute information from a stored video file, extracting samples corresponding to an extended temporal layer from the extracted video data stream on the basis of location information of a sample enabling temporal layer access, which is included in the video data attribute information, performing reconstruction on the extracted samples, and reproducing the reconstructed samples.

In accordance with another aspect of the present disclosure, an apparatus for reproducing video data is provided. The apparatus includes a video data extraction unit configured to extract a coded video data stream from a stored video file, a video attribute extraction unit configured to extract video data attribute information from the stored video file, a temporal layer extraction unit configured to extract samples corresponding to an extended temporal layer from the extracted video data stream on the basis of location information of a sample enabling temporal layer access, which is included in the video data attribute information, and a reproduction unit configured to perform reconstruction on the extracted samples and to reproduce the reconstructed samples.

The present disclosure provides temporal layer access location information for extending a temporal layer through a box having a file format. Accordingly, when video data stored in a high efficiency video coding file format is reconstructed, Network Abstraction Layer (NAL) header information corresponding to each sample is not analyzed in order to recognize temporal layer access location information, but samples can be selectively extracted from among samples located so as to enable the extension of a temporal layer and the extracted samples can be delivered to a reconstructor.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, description of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In various embodiments of the present disclosure described below, a file format includes hierarchical boxes defined in the International Organization for Standardization base media File Format (ISOFF), and each box is configured to have a form of including coded media data and attribute information of media data.

The various embodiments of the present disclosure add, to a file format, a box representing a sample number corresponding to a temporal layer access picture in high efficiency video coding technology, and thereby provide location information enabling the extension of a temporal layer through a file storage format.

Figure 1:
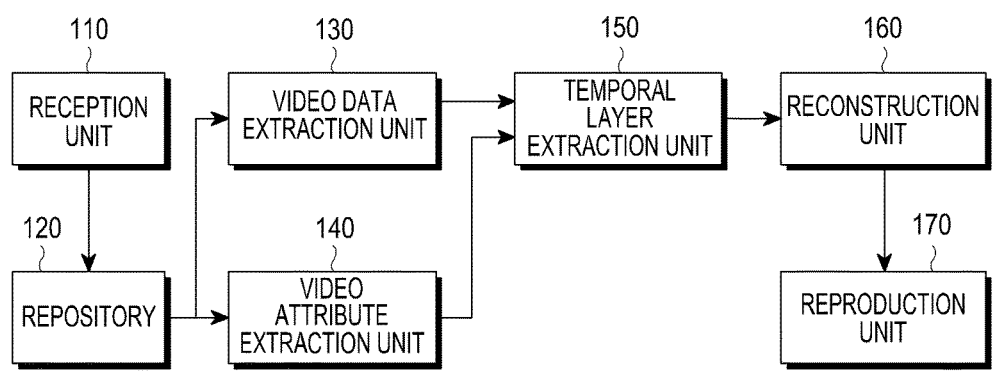
FIG. 1 is a block diagram illustrating a configuration of an apparatus for reproducing media data according to an embodiment of the present disclosure.

FIG. 1 is a block diagram illustrating a configuration of an apparatus for reproducing media data according to an embodiment of the present disclosure.

Referring to FIG. 1, a reception unit 110 receives media data, such as through a network streaming, and stores the received media data in a repository 120 in the form of a storage format. The repository 120 stores media data configured in a basic box structure defined in the ISOFF. A video file included in media data stored in the repository 120 includes a video stream coded by using the high efficiency video coding compression technology. In an embodiment of the present disclosure, a case is considered in which the video file included in the media data stored in the repository 120 is a file having an ISOFF-based high efficiency video coding file format.

A video data extraction unit 130 extracts a coded video data stream from an 'mdat' box of a video file stored in the repository 120 in the form of the high efficiency video coding file format. A video attribute extraction unit 140 extracts video data attribute information from a 'moov' box of a video file stored in the form of the high efficiency video coding file format. The video data attribute information extracted from the 'moov' box includes sample number information provided by a 'sample table (stbl)' box and temporal layer access location information of a sample enabling temporal layer access according to an embodiment of the present disclosure.

A temporal layer extraction unit 150 extracts samples related to an extended temporal layer among video streams extracted by the video data extraction unit 130 on the basis of sample number information enabling extension of a temporal layer, which has been extracted by the video attribute extraction unit 140, at a time point when the extension of the temporal layer is required during reproduction of a video file. As described above, an embodiment of the present disclosure provides the sample number information enabling the extension of the temporal layer, and thereby may recognize, before a reconstruction process, temporal layer access information which may be acquired in the process for reconstructing a video stream by a reconstruction unit 160.

The samples related to the extended temporal layer, which have been extracted by the temporal layer extraction unit 150, are delivered to the reconstruction unit 160 and are reconstructed by the reconstruction unit 160. Then, the reconstructed samples are reproduced by a reproduction unit 170.

Figure 2:
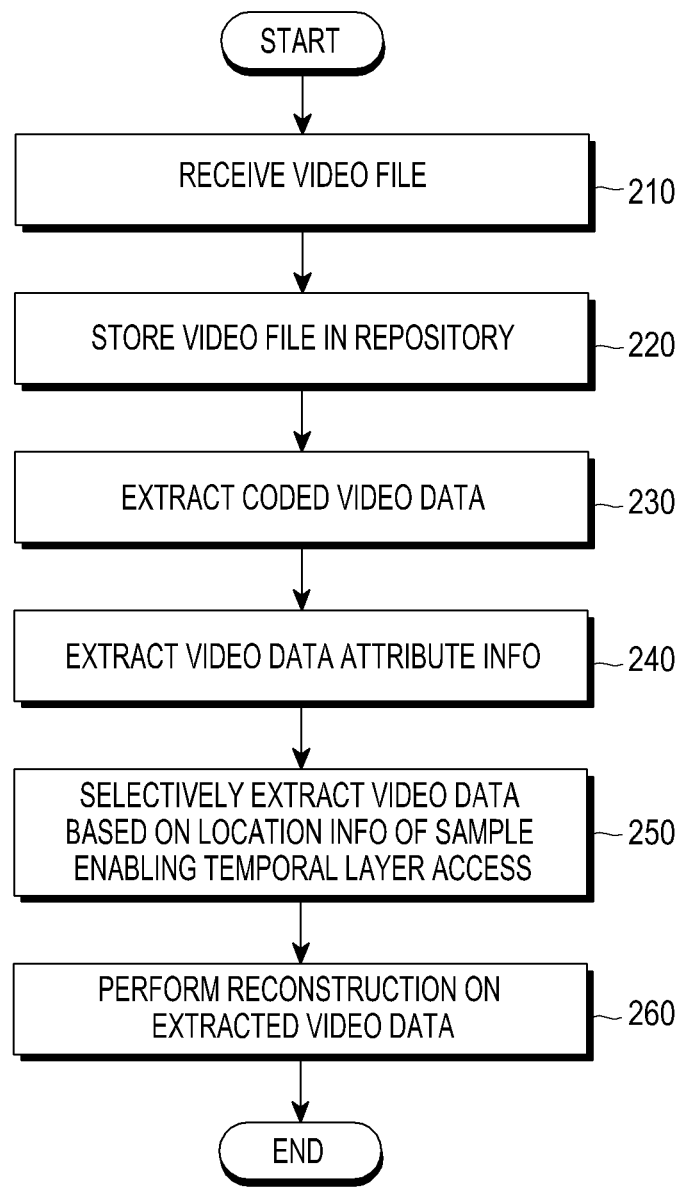
FIG. 2 is a flowchart illustrating a process for reproducing media data according to an embodiment of the present disclosure.

FIG. 2 is a flowchart illustrating a process for reproducing media data according to an embodiment of the present disclosure.

Referring to FIG. 2, when media data including a video file is received in operation 210, the received video file is stored in the repository in the ISOFF-based storage format in operation 220. In operation 230, a video data stream is extracted from an mdat box of the video file coded from a video file having the high efficiency video coding file format. In operation 240, video data attribute information is extracted from a moov box of the video file having the high efficiency video coding file format. The video data attribute information extracted according to an embodiment of the present disclosure includes temporal layer access location information of a sample enabling temporal layer access to the video file. In operation 250, samples corresponding to a basic temporal layer and samples corresponding to an extended temporal layer are extracted, after the relevant sample on the basis of the temporal layer access location information of the sample enabling the temporal layer access, which has been extracted in operation 240. In operation 260, reconstruction is performed on the extracted samples, and the reconstructed samples are reproduced.

Figures 3, 4:
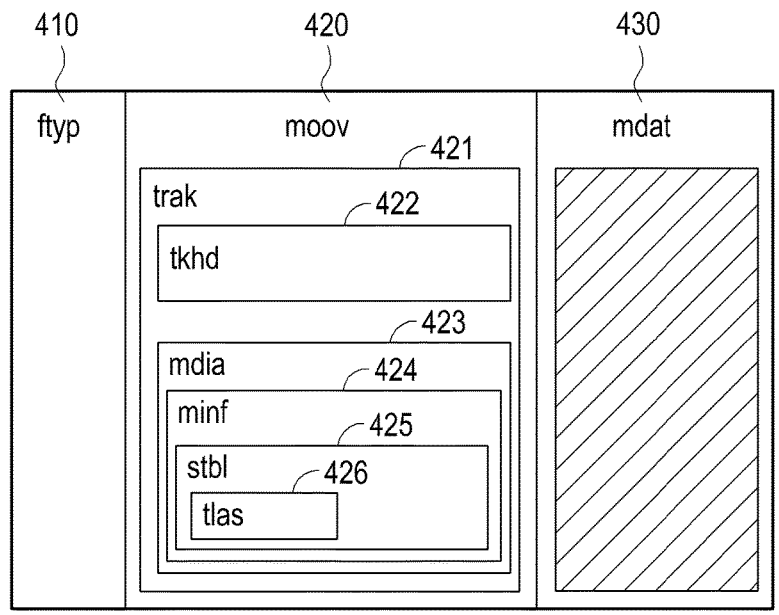
FIG. 3 illustrates a syntax representing location information of a sample enabling temporal layer access according to an embodiment of the present disclosure.
FIG. 4 is a view illustrating a box structure of an International Organization for Standardization base media File Format (ISOFF)-based video file stored so as to include temporal layer access sample information according to an embodiment of the present disclosure.

FIG. 3 illustrates a syntax representing location information of a sample enabling temporal layer access according to an embodiment of the present disclosure.

Referring to FIG. 3, the temporal layer access sample (tlas) box according to an embodiment of the present disclosure is included in an IS OFF-based 'stbl' box, and provides a sample number within a video stream, which enables temporal layer access for extending a temporal layer. Referring to the syntax illustrated in FIG. 3, the temporal layer access location information according to an embodiment of the present disclosure includes an 'entry_count' representing information on the total number of samples enabling the temporal layer access within the video stream, and a 'sample number' representing a sample number enabling the temporal layer access according to a number indicated by the 'entry_count.' A receiver may recognize information on a sample number enabling the extension of the temporal layer through the value of the 'sample_number,' and may extract a sample from a video file stored in the form of a file format, starting from an extraction start point of the temporal layer samples extended according to the extension of the temporal layer, on the basis of the recognized sample number.

FIG. 4 is a view illustrating a box structure of an ISOFF-based video file stored so as to include temporal layer access sample information according to an embodiment of the present disclosure.

Referring to FIG. 4, the box structure of the video file according to an embodiment of the present disclosure includes an ftyp box 410 indicating type information of a file, a moov box 420 including video data attribute information, and an mdat box 430 including coded video data.

A trak box 421 included in the moov box 420 includes information searching for one track representing a set of mutually related samples among presentations which are one or more motion sequences capable of being combined with audio. A 'track header (tkhd)' box 422 included in the trak box 421 includes all pieces of information on a current track. A mdia box 423 includes declaration information on media of the current track. A minf box 424 included in the mdia box 423 includes attribute information on the media of the current track. The minf box 424 includes, therein, a stbl box 425 which includes indexing information on time, data and a position of each of samples within a track. A tlas box 426 according to an embodiment of the present disclosure is located within the stbl box 425 and provides indexing information on a sample enabling temporal layer access.

Figure 5:
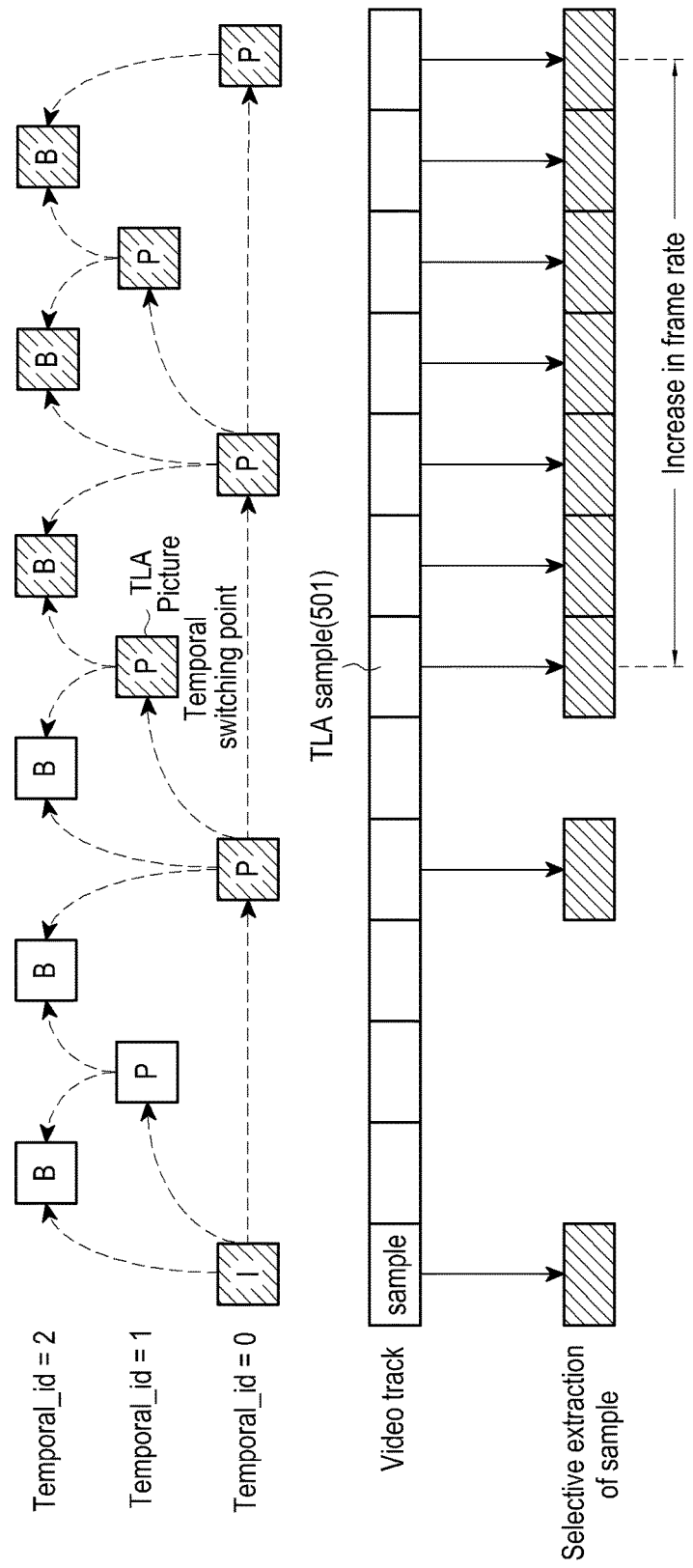
FIG. 5 is a view illustrating a scene of selectively extracting samples according to an embodiment of the present disclosure.

FIG. 5 is a view illustrating a scene of selectively extracting samples according to an embodiment of the present disclosure.

Referring to FIG. 5, with a Temporal Layer Access (TLA) sample 501, which is included in a video track, as a start point (i.e., a temporal switching point), samples (samples having temporal_id=2 in FIG. 5) may be extracted which have a larger temporal layer identification value than a temporal layer identification value (i.e., temporal_id=1) of a temporal layer of a temporal layer access sample 501. Accordingly, a frame rate increases after the temporal layer access sample 501.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for reproducing video data, the method comprising:
   receiving a video file comprising a video data stream and attribute information of the video data stream, the attribute information comprising a temporal layer identification value and a sample number of each of at least two samples enabling extension of a temporal layer;
   identifying at least one sample having the temporal layer identification value corresponding to a basic temporal layer from the video data stream, and decoding and playing the identified at least one sample;
   if the extension of the temporal layer is required during playing of the identified at least one sample, determining a sample having a lowest sample number among the at least two samples enabling the extension of the temporal layer as a temporal switching point based on the attribute information;
   identifying at least one sample having a larger temporal layer identification value than a temporal layer identification value of the sample and a larger sample number than the lowest sample number from the video data stream; and
   after the temporal switching point, decoding and playing the identified at least one sample having the larger temporal layer identification value with the identified at least one sample having the temporal layer identification value corresponding to the basic temporal layer.

2. The method of claim 1, wherein the attribute information further comprises a total number of the at least two samples enabling extension of the temporal layer.

3. The method of claim 1, wherein the received video file is stored in an international organization for standardization base media file format (ISOFF), and the attribute information is included in a sample table (stbl) box of the ISOFF.

4. The method of claim 3, wherein the attribute information is inserted in a new box included in the stbl box.

5. An apparatus for reproducing video data, the apparatus comprising:
 a display device;
 a reception device configured to receive a video file comprising a video data stream and attribute information of the video data stream, the attribute information comprising a temporal layer identification value and a sample number of each of at least two samples enabling extension of a temporal layer; and
 at least one processor configured to control to:
  identify at least one sample having the temporal layer identification value corresponding to a basic temporal layer from the video data stream, decode and play the identified at least one sample,
  if the extension of the temporal layer is required during playing of the identified at least one sample, determine a sample having a lowest sample number among the at least two samples enabling the extension of the temporal layer as a temporal switching point based on the attribute information,
  identify at least one sample having a larger temporal layer identification value than a temporal layer identification value of the sample and a larger sample number than the lowest sample number from the video data stream after the temporal switching point, and
  after the temporal switching point, decode and play the identified at least one sample having the larger temporal layer identification value with the identified at least one sample having the temporal layer identification value corresponding to the basic temporal layer.

6. The apparatus of claim 5, wherein the attribute information further comprises a total number of the at least two samples enabling extension of the temporal layer.

7. The apparatus of claim 5, wherein the video file is stored in an international organization for standardization base media file format (ISOFF), and the attribute information is included in a sample table (stbl) box of the ISOFF.

8. The apparatus of claim 7, wherein the attribute information is inserted in a new box included in the stbl box.

* * * * *